United States Patent [19]
Carpenter et al.

[11] Patent Number: 5,462,312
[45] Date of Patent: Oct. 31, 1995

[54] TUBING COUPLING ENCLOSURE

[75] Inventors: Val Carpenter; Steve W. Webb, St. George, both of Utah

[73] Assignee: Conducit Repair Systems, Inc., St. George, Utah

[21] Appl. No.: 264,576

[22] Filed: Jun. 23, 1994

[51] Int. Cl.[6] .................................................. F16L 21/06
[52] U.S. Cl. .............................. 285/15; 285/31; 285/419
[58] Field of Search ........................ 285/419, 15, 31, 285/417, 373; 403/309–313

[56] References Cited

U.S. PATENT DOCUMENTS

| | | | |
|---|---|---|---|
| 3,229,998 | 1/1966 | Pennington | 285/419 |
| 3,711,633 | 1/1973 | Ghirardi et al. | 403/313 |
| 3,826,521 | 7/1974 | Wilhelmsen | 285/31 |
| 4,103,943 | 8/1978 | Curtin | 285/419 |
| 4,352,512 | 10/1982 | Janssen et al. | 285/419 |
| 4,521,037 | 6/1985 | Knox | 285/31 |
| 4,629,216 | 12/1986 | Pedersen | 285/419 |
| 4,690,434 | 9/1987 | Schmidt | 285/31 |
| 5,015,013 | 5/1991 | Nadin | 285/419 |
| 5,029,905 | 7/1991 | Johnson | 285/31 |
| 5,308,192 | 5/1994 | Srackangast | 285/15 |

FOREIGN PATENT DOCUMENTS 2025154  1/1980  United Kingdom ................. 285/419

*Primary Examiner*—Eric K. Nicholson
*Attorney, Agent, or Firm*—Longacre & White

[57] ABSTRACT

The present disclosure concerns an enclosure for establishing a coupling between two tubes. In particular, the invention provides shielding for transmission lines extending through the coupling. The enclosure is comprised of lengths of identical split tubing portions are engaged with one another form a tubular replacement section. Identical interlocking elements engage one another and secure the replacement section between the two tubes.

19 Claims, 2 Drawing Sheets

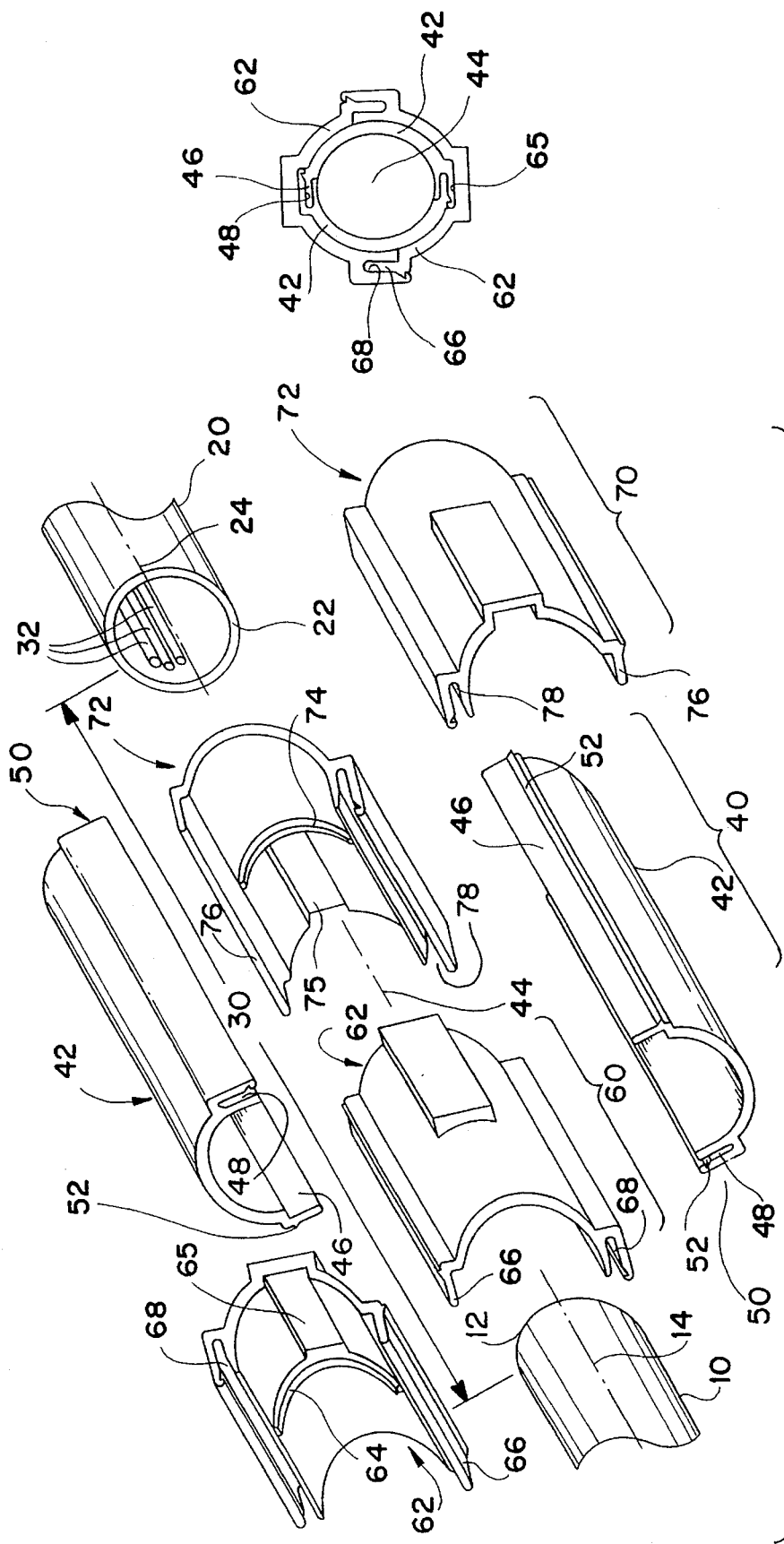

TUBING COUPLING ENCLOSURE

BACKGROUND OF THE INVENTION a) Field of the Invention

The invention generally concerns an enclosure for establishing a coupling between two lengths of tubing. In particular, the invention provides shielding for transmission lines extending through the coupling.

b) Description of Related Art

In order to splice, repair or access transmission lines running through a continuous length of protective tubing, it is necessary to remove a portion of the tubing. Conventionally, this is accomplished by cutting away a section of the tubing leaving a pair of tubing terminuses and an interposed gap.

To provide some measure of protection to the otherwise exposed transmission lines, it is known to apply a coating of material which concurrently congeals around the terminuses and the exposed transmission lines. Disadvantages of such a system generally include protection which deteriorates over time as the coating becomes brittle, and insufficient impact resistance.

It is also known to axially slit a piece of replacement tubing which has a slightly larger diameter than the original tubing. The replacement tubing is expanded and slipped over the exposed transmission lines so as to extend between and overlay both terminuses. Disadvantages of this system include difficulty expanding and installing the replacement tubing, as well as a significant potential of irreparably deforming the replacement tubing.

SUMMARY OF THE INVENTION

An objective of the present invention is to provide an enclosure which overcomes the aforementioned disadvantages of the conventionally known systems.

Another objective of the present invention is to provide an enclosure which includes an intermediate section substantially filling the gap between the two terminuses. The intermediate section is composed of multiple elements which are easily fit together so as to circumscribe the exposed transmission lines. To ensure proper alignment and sealing, end sections overly and circumscribe both one terminus and a portion of the intermediate section. Again, the end sections are composed of multiple elements which are easily fit together to facilitate a simple, reliable, quick and inexpensive apparatus for shielding the formerly exposed transmission lines.

BRIEF DESCRIPTION OF THE DRAWINGS

FIG. 1 is an exploded view of a collinear arrangement according to the present invention.

FIG. 2 is a cross-section taken through an end section overlaying the intermediate section in an assembled state of the present invention.

DESCRIPTION OF THE PREFERRED EMBODIMENT

Figure 3:
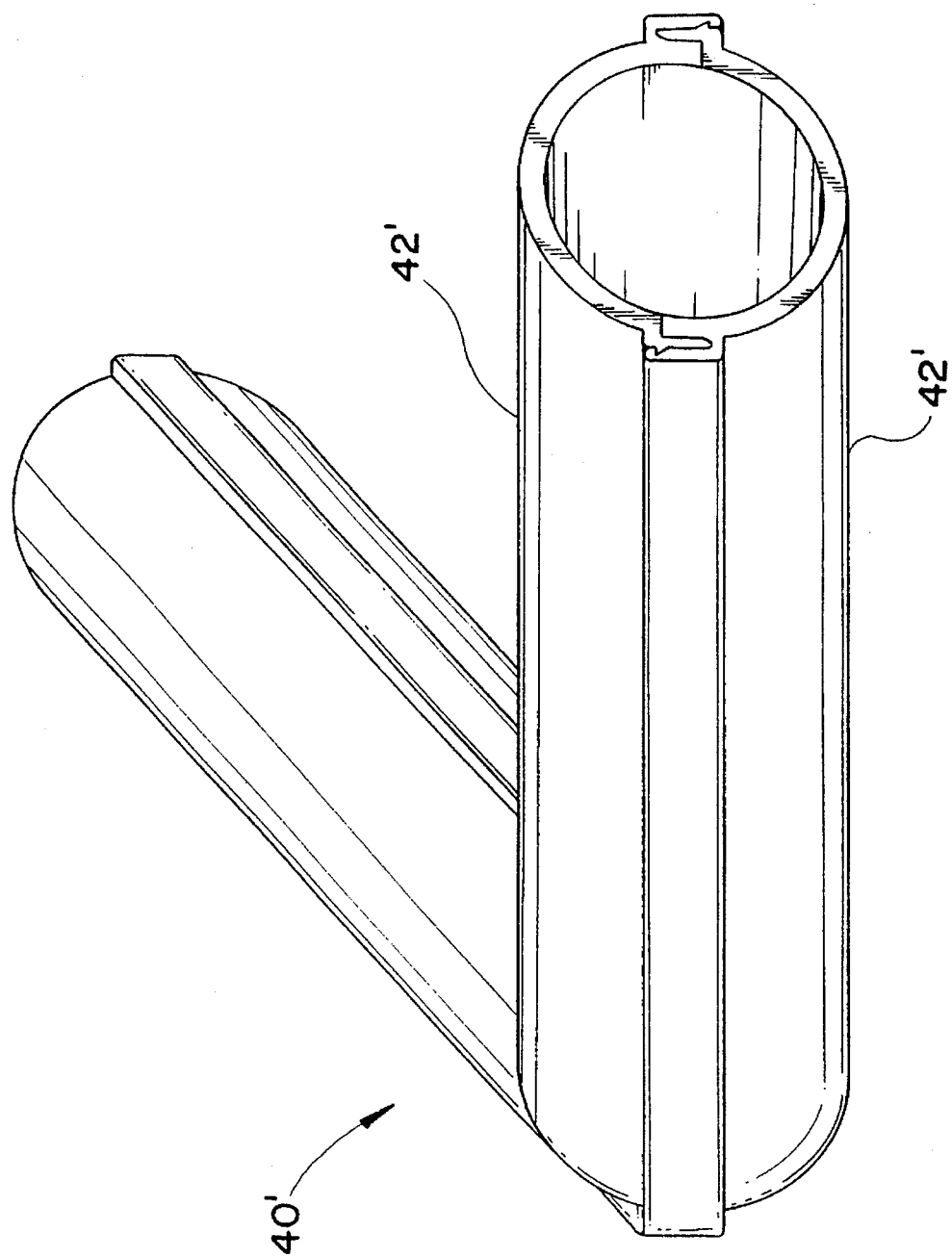
FIG. 3 is an perspective view of an angular arrangement according to the present invention.

FIGS. 1 and 2 show a first length of tubing 10 ending at a first terminus 12. A first longitudinal axis 14 extends through the first length of tubing 10. A second length of tubing 20 ending at a second terminus 22 is separated from the first length of tubing 10 by a gap 30. A second longitudinal axis 24 extends through the second length of tubing 20 and is collinear with respect to the first longitudinal axis 14. One or more transmission lines 32 run through the first length of tubing 10 as well as the second length of tubing 20. It is envisioned that the transmission line(s) 32 are metal wires or fiber optic cables, however the type of transmission line 32 is not critical to the present invention.

An intermediate section 40 comprises a plurality of first interlocking elements 42 fitted together with one another. FIG. 1 shows a pair of first interlocking elements 42, however it is envisioned that more than two first interlocking elements 42 are possible.

The intermediate section 40 spans substantially the whole gap 30 and is easily assembled by pressing the first interlocking elements 42 toward one another in a direction generally transverse to a longitudinal axis 44 of the intermediate section 40. As shown, the first interlocking elements 42 are formed from identical lengths of extruded material having a first extension 46 and a first groove 48 on opposite sides.

The extensions 46 and grooves 48 cooperatively join the first interlocking elements 42 at interfaces which form projections 50 extending radially outward from the outside diameter of the intermediate section 40. One or more flared teeth 52 on either or both of the extension 46 and the groove 48 are intended to irreversibly lock the first interlocking elements 42 together.

Generally, it is envisioned that the internal and external diameters of the assembled intermediate section 40 will correspond to those of the first and second lengths of tubing 10,20. Further, the projections 50 extend radially outward from the external diameter common to both the lengths of tubing 10,20 and the intermediate section 40.

A first end section 60 comprises a plurality of second interlocking elements 62 fitted together with one another. Similarly, a second end section 70 comprises a plurality of third interlocking elements 72 fitted together with one another. FIG. 1 shows a pair of second and third interlocking elements 62,72, however it is envisioned that more than two of each are possible. As shown, the second and third interlocking elements 62,72 are identically formed by injection molding and include second and third extensions 66,76, as well as second and third grooves 68,78 on opposite sides.

The first and second end sections 60,70 each further include recess 65,75 extending radially outward from the inside diameter of the second and third interlocking elements 62,72. The recesses 65,75 are adapted to receive the projections 50 from the intermediate section 40.

Coinciding with the axial end of the recesses 68,78, ribs 64,74 extend radially inward and around the inside diameter of the second and third interlocking elements 62,72, respectively. When assembled, the ribs 64 are axially interposed between the intermediate section 40 and the first terminus 12 whereas the ribs 74 are axially interposed between the intermediate section 40 and the second terminus 22.

It is further envisioned that glue, silicon or some other sealant may be interposed at all the interfaces between the components in order to provide a waterproof barrier.

FIG. 3 shows an alternate embodiment of the present invention wherein the intermediate section 40' is composed of several injection molded first interlocking elements 42' which form an angular bend. It is further envisioned that additional embodiments could form T-shaped junctions, four-way junctions, etc.

What is claimed is:

1. An enclosure for a splice connection between a first and a second length of tubing, the first length of tubing has a first longitudinal axis and a first terminus, the second length of tubing has a second longitudinal axis and a second terminus, a gap exists between the first terminus and the second terminus, said enclosure comprising:

an intermediate section extending between the first terminus and the second terminus so as to substantially fill the gap, said intermediate section includes a plurality of first identical interlocking elements;

a first end section overlying and circumscribing portions of both the first terminus and said intermediate section, said first end section includes a plurality of second identical interlocking elements; and, a second end section overlying and circumscribing portions of both the second terminus and said intermediate section, said second end section includes a plurality of third identical interlocking elements.

2. The enclosure according to claim 1, wherein the first and second axes are collinear, and said intermediate section has a linear longitudinal axis collinear with the first and second axes.

3. The enclosure according to claim 1, wherein the first and second axes intersect one another at an angle greater than 0° and less than 180°.

4. The enclosure according to claim 3, wherein said angle is 90° and said first and second axes define a plane, said plurality of first interlocking elements have an interface in said plane.

5. The enclosure according to claim 1, wherein an internal diameter of said intermediate section is substantially equivalent to a common internal diameter of the first and second lengths of tubing.

6. The enclosure according to claim 1, wherein an external diameter of said intermediate section is substantially equivalent to a common external diameter of the first and second lengths of tubing.

7. The enclosure according to claim 6, wherein a common internal diameter of said first and second end sections is substantially equivalent to both said external diameter of said intermediate section as well as said common external diameter of the first and second lengths of tubing.

8. The enclosure according to claim 1, wherein said plurality of first interlocking elements are substantially identical to one another, and each said first interlocking member occupies a substantially equal circumferential portion around a longitudinal axis of said intermediate section.

9. The enclosure according to claim 1, wherein said plurality of second interlocking elements are substantially identical to one another, and each said second interlocking element circumscribes a substantially equal portion of said intermediate section.

10. The enclosure according to claim 1, wherein said plurality of third interlocking elements are substantially identical to one another, and each said third interlocking element circumscribes a substantially equal portion of said intermediate section.

11. The enclosure according to claim 1, wherein said second and third interlocking elements are substantially identical to one another.

12. The enclosure according to claim 1, wherein said first interlocking elements are extruded.

13. The enclosure according to claim 1, wherein said second and third interlocking elements are injection molded.

14. The enclosure according to claim 1, wherein interfaces between said first interlocking elements form projections extending radially outward from an outside diameter of said intermediate section.

15. An enclosure for a splice connection between a first and a second length of tubing, the first length of tubing has a first longitudinal axis and a first terminus, the second length of tubing has a second longitudinal axis and a second terminus, a gap exists between the first terminus and the second terminus, said enclosure comprising:

an intermediate section extending between the first terminus and the second terminus so as to substantially fill the gap, said intermediate section includes a plurality of first interlocking elements;

a first end section overlying and circumscribing portions of both the first terminus and said intermediate section, said first end section includes a plurality of second interlocking elements; and, a second end section overlying and circumscribing portions of both the second terminus and said intermediate section, said second end section includes a plurality of third interlocking elements;

wherein interfaces between said first interlocking elements form projections extending radially outward from an outside diameter of said intermediate section; and, wherein recesses extend radially outward from an inside diameter of said first and second end sections, said projections are cooperatively received in said recesses.

16. An enclosure for a splice connection between a first and a second length of tubing, the first length of tubing has a first longitudinal axis and a first terminus, the second length of tubing has a second longitudinal axis and a second terminuS, a gap exists between the first terminus and the second terminus, said enclosure comprising:

an intermediate section extending between the first terminus and the second terminus so as to substantially fill the gap, said intermediate section includes a plurality of first interlocking elements;

a first end section overlying and circumscribing portions of both the first terminus and said intermediate section, said first end section includes a plurality of second interlocking elements; and, a second end section overlying and circumscribing portions of both the second terminus and said intermediate section, said second end section includes a plurality of third interlocking elements;

wherein a rib extends radially inward and around an inside diameter of each said second and third interlocking element, said ribs on said second interlocking elements are axially positioned between said intermediate section and the first terminus, and said ribs on said third interlocking elements are axially positioned between said intermediate section and the second terminus.

17. The enclosure according to claim 1, further comprising:

locking means for preventing transverse separation of said plurality of first interlocking elements.

18. The enclosure according to claim 17, wherein said locking means include at least one flared tooth member on a first one of said plurality of first interlocking elements, said at least one flared tooth member is irreversibly inserted into a groove on a second one of said plurality of first interlocking elements.

19. The enclosure according to claim 1, further comprising:

sealing means for providing a waterproof barrier at interfaces between said first, second and third interlocking members, as well as with the first and second lengths of tubing.

\* \* \* \* \*